United States Patent [19]

Mantovani

[11] Patent Number: 4,793,039
[45] Date of Patent: Dec. 27, 1988

[54] ELECTRONICALLY CONTROLLABLE ROTARY TRANSFER MACHINE

[75] Inventor: Elis Mantovani, Cadempino, Switzerland

[73] Assignee: Tecnodelta S.A., Manno, Switzerland

[21] Appl. No.: 89,986

[22] Filed: Aug. 27, 1987

[30] Foreign Application Priority Data

Jul. 27, 1987 [CH] Switzerland .................. 02868/87

[51] Int. Cl.⁴ .............................................. B23P 23/00
[52] U.S. Cl. ................................... 29/38 B; 29/37 R; 29/38 R
[58] Field of Search ............... 29/33 P, 563, 38 R, 29/38 B, 38 C, 37 R, 564; 74/813 R

[56] References Cited

U.S. PATENT DOCUMENTS

| | | | |
|---|---|---|---|
| 2,825,121 | 3/1958 | Williams | 29/37 R |
| 2,873,628 | 2/1959 | Stuart | 29/38 B X |
| 2,886,836 | 5/1959 | Moeltzner | 29/38 B X |
| 4,185,366 | 1/1980 | Gilbert | 29/37 R |
| 4,287,748 | 9/1981 | Wolfthal | 29/38 C X |
| 4,557,166 | 12/1985 | Jauch | 29/38 C X |
| 4,680,842 | 7/1987 | Moyer | 29/563 |

FOREIGN PATENT DOCUMENTS

| | | | |
|---|---|---|---|
| 1502033 | 6/1969 | Fed. Rep. of Germany | 29/38 C |
| 1477691 | 7/1969 | Fed. Rep. of Germany | 29/38 C |
| 2346762 | 3/1975 | Fed. Rep. of Germany | 29/38 C |
| 2927071 | 2/1980 | Fed. Rep. of Germany | 29/38 R |
| 27358 | 3/1978 | Japan | 29/38 R |
| 48247 | 3/1985 | Japan | 29/563 |
| 1040696 | 11/1985 | U.S.S.R. | 29/38 R |
| 1206023 | 1/1986 | U.S.S.R. | 409/230 |
| 1224105 | 4/1986 | U.S.S.R. | 29/37 R |

Primary Examiner—William R. Briggs
Attorney, Agent, or Firm—Young & Thompson

[57] ABSTRACT

In its simplest form, the automatic transmission machine under discussion, with electronically controllable intermittently rotating table (FIG. 1), is made up of an annular base support (1) consisting of two half-plates (1' and 1") on whose opposite external surface are fastened, on radial axes, operating units (6, 11, etc.) achieving a notable plurality of axes, and containing guide elements (2 and 4) of a ring (3) holding collet-holding table (24), achieving the extreme precision and rigidity of the table itself which is rapidly substitutable by another one with different functions or dimensions, making possible great versatility, being able to have collets (23) as fixed axes, orientable or dynamic and placed axially or radially or both.

14 Claims, 7 Drawing Sheets

ELECTRONICALLY CONTROLLABLE ROTARY TRANSFER MACHINE

BACKGROUND OF THE INVENTION

So-called rotary transfer machines are known, comprising a table rotating intermittently around a vertical or horizontal axis, holding near the periphery at equal angular distances a plurality of self-centering collets which hold the pieces to be worked. A frame placed on the periphery of said collet-holding table holds arbors constituting the operating units.

For every angular movement of the collet-holding table, i.e., at each stopping point or station, the various pieces to be worked undergo a work phase, by which each piece, at each complete rotation of the collet-holding table, undergoes all the work phases and is ejected finished.

The word "transfer" is to indicate the transfer of a piece being worked from one station to the next to perform a determined succession of work phases according to a precise plan or work cycle.

These known machines exhibit drawbacks. For example, when it is necessary to work, on both ends, a piece with a long shape which is held by self-centering collets at one end, it is not possible to assure a perfect working of the two ends since one end is not guided or in any case is held with slight rigidity because of the excessive distance from the fastening point, and is therefore subjected to vibrations and not concentric.

Further, it being necessary to go from one piece to the next, the known machines require for setting up of individual stations, and for changing of the collets and tools, operators highly skilled over a long period. The design of the known machines is such that the mobile parts, constituting the collet-holding table, control of the operating units and the arbors, constitute a set of several pieces and are of notable bulk; for which reason, strong accelerations must be avoided so as not to compromise the precision and life itself of the machine, with consequent notable reduction of rate of work and therefore of productivity. Finally, the kinematic mechanisms of known machines impose working by making cutting oil circulate as coolant for the tools and lubricant for the various mobile parts of the machine, for which reason, it is not possible, for example, to perform operations of grinding or welding or certain assemblies, or any way problems arise such as:

work hygiene because of allergy of some operators;
  impact on production costs because of the high cost of oils themselves;
  environmental damage because of high contamination caused by said oils.

SUMMARY OF THE INVENTION

These and other drawbacks are completely eliminated, according to the invention, which has as its object an automatic transfer machine, with a collet-holding table rotating intermittently and, electronically controllable, making it possible to execute, with high productivity, with very high precision and with even very diverse technologies, on pieces of different size and even of notable length, simultaneous operations—working, welding, assembly, marking, treatment, dimensional and functional checking, etc.—on different points of the piece, even opposite, and with respect to a plurality of axes greater than that now known, with the cooperation of mobile parts having minimum bulk.

The innovative design of the machine in question gives it those static, dynamic, dimensional and use characteristics—fast substitution, with maximum axial and radial precision, of the collet-holding table with another one having different functions and dimensions—and, together with vast possibilities of assigning the work movement and the relative parameters of speed to the piece or the tool or both and the free choice of the direction of work, making possible the rational application of technologies normally not suitable for known transfer machines or simply the development of new unpublished technologies.

BRIEF DESCRIPTION OF THE FIGURES

The accompanying drawings represent a preferred nonlimiting embodiment of the machine according to the invention.

FIGS. 7a/1-7, 7b/1-7 and 7c/1-7 represent some work cycles relating to the typical pieces that can be produced with said machine.

DETAILED DESCRIPTION

A preferred nonlimiting, nonbinding embodiment of the machine with seven-position collet-holding table will be described.

Figures 1, 1A, 1B:
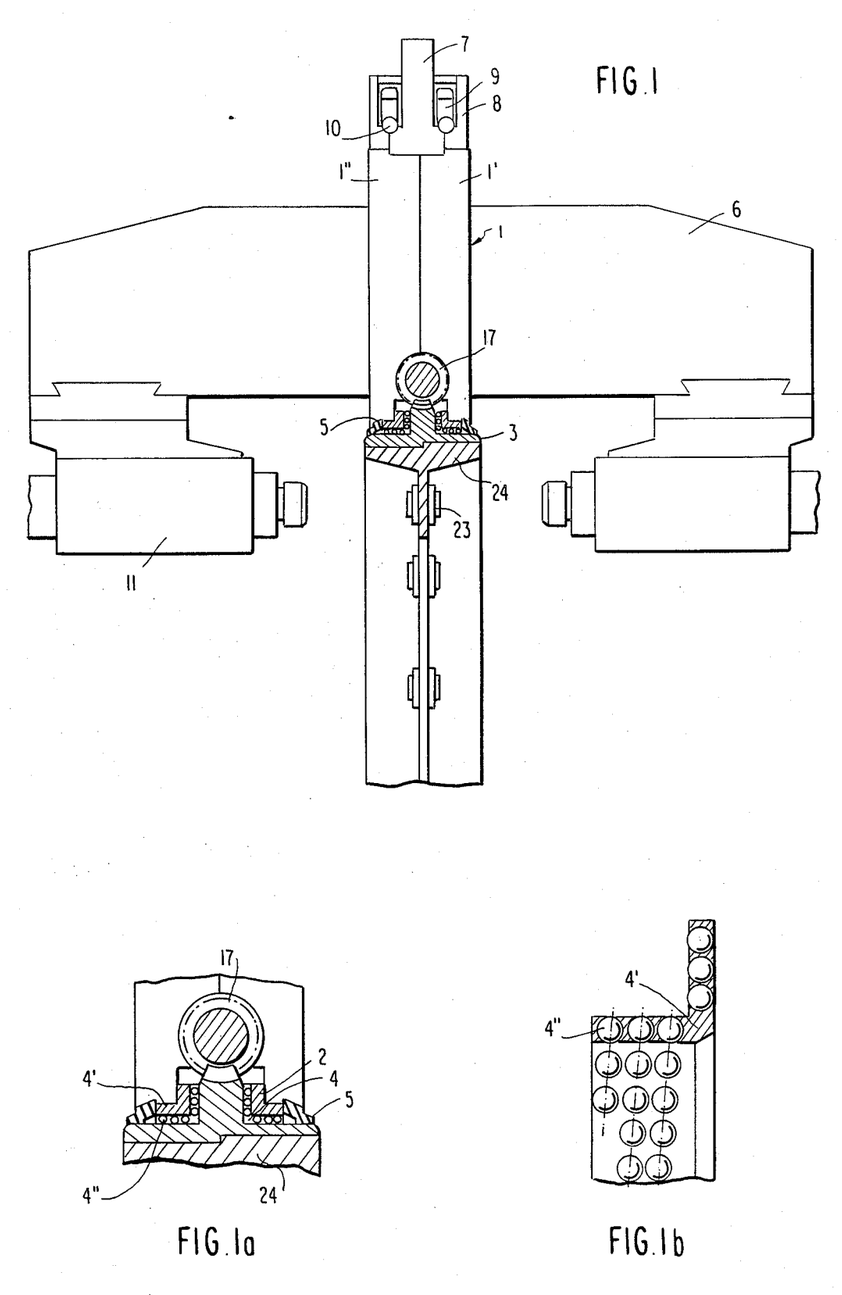
FIG. 1 represents the axial cross section of the machine.
FIG. 1a represents in section a detail of the guide elements of the table-holding ring.
FIG. 1b represents in section a detail of the combined axial-radial ball bearing cage.

With reference to FIG. 1, the machine comprises a collet-holding table 24 rotating angularly intermittently and on whose periphery are placed seven collet-holding groups 23 which can have their own rotary movement around its own axis imparted by a single central high-frequency induction electric motor, or imparted by as many small induction electric motors, one for each collet-holder, also of high-frequency.

The collet-holding table 24 is normally inserted in a table-holding ring 3 as shown in FIG. 1a, in turn contained in half-plates 1' and 1" and guided by guide elements 2 and 4, to allow the fast substitution of the table itself with another one having other functions or dimensions. It can also be inserted directly, without the aid of ring 3 into half-plates 1' and 1" and guided by guide elements 2 and 4. In this case, the shape and dimensions of the peripheral part will be identical with those of table-holding ring 3 and obviously considerably longer times will be required for its substitution.

Figure 2:
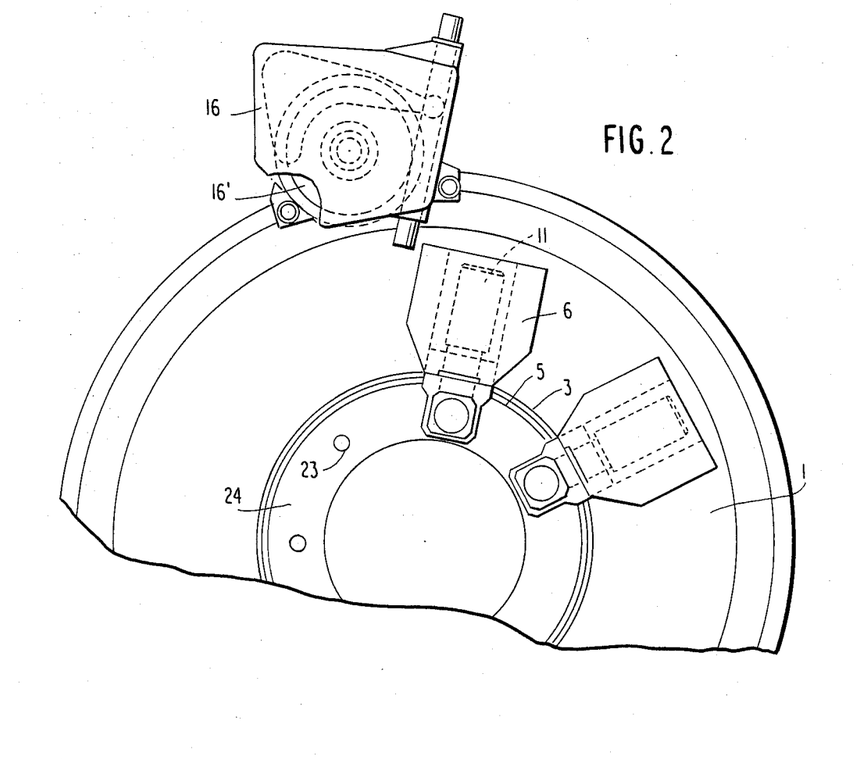
FIG. 2 represents a partial plan view of the unit made up of the base support, a collet-holding table, the operating units and the cam control.

The guide elements shown in FIG. 1a consist of two high-precision ball bearings 2 and 4, whose races 2 are inserted in half-plates 1' and 1", forced with notable interference, then ground after assembly to the half-plates constituting annular support 1, to which are fastened operating units 6 shown in FIGS. 1 and 2, to obtain the best values of curvature and planarity. Rolling elements 4 consist of two ball-holding cages 4 and thousands of balls 4" as shown in FIG. 1b, with their combined axial and radial action, and the assembly tolerances of table-holding ring 3, rotating and positionable, wich provide 0.005–0.007 mm of interference—or prestress of the bearings—to assure the highest precision and great static and dynamic mechanical rigidity. The arrangement of balls 4" in ball-holding cage 4' is such as to allow high load and practically zero wear capacity since:

- balls 4" which act radially are placed very close together, to achieve the maximum possible number, and in a spiral with different initial positions, whereby each ball rolls along its circumference at a distance of a few hundred millimeters from the closest one;
- balls 4" act axially, unlike those acting radially, but to obtain the same work condition, are placed in a spiral with different initial positions;
- the diameterof races 2 both axial and radial, is selected so that the corresponding numerical value is a prime number, whereby each ball returns to the same stopping points after having completed several thousand complete rotations.

Figure 3:
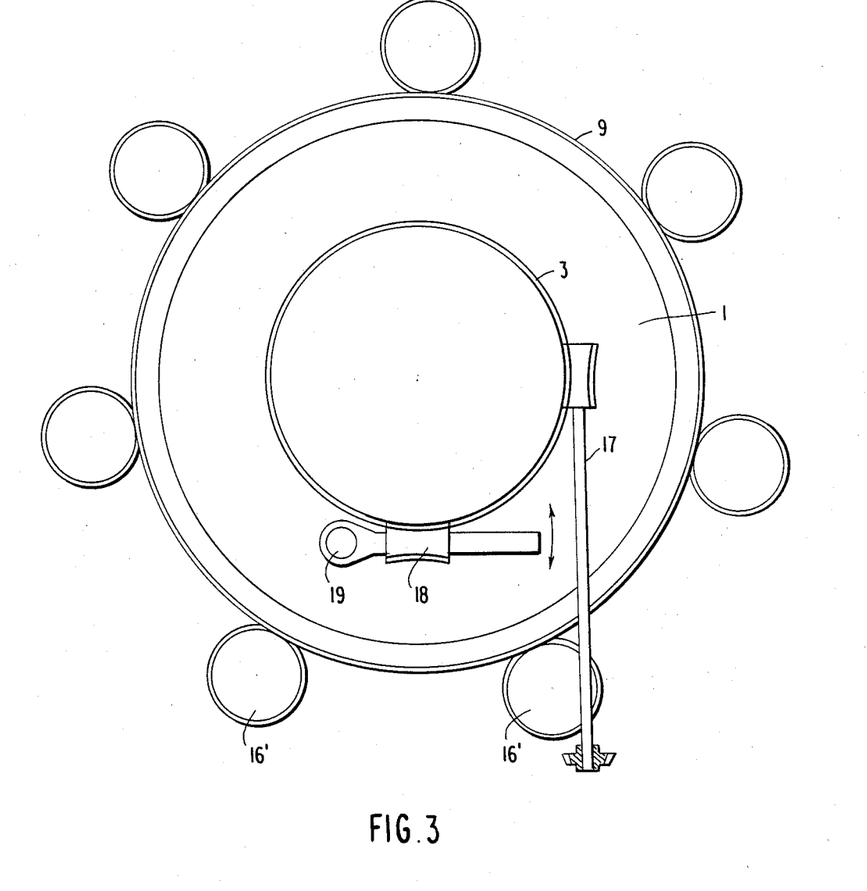
FIG. 3 is a diagram of the mechanical elements that control the rotation of the collet-holding table, the positioning and the cam-holding groups.

The two packings 5 have the function of protecting bearings 4 and hourglass screws 17, 18 (FIG. 3) for preventing metal particles and abrasive powders from being able to reach the delicate mechanical parts, which are fundamental for the functioning and precision of the machine. The geometric shape makes it possible to remove them from the seats and substitute them without dismounting other parts.

Table-holding ring 3 contained in the annular support base 1 is an intermediate element which takes on the important functions of rotation and positioning of collet-holding table 24 shown in FIGS. 1 and 5 (embodiments a–m) for transferring them to the table itself, making possible the fast substitution of the table with another one having different functions or dimensions without compromising the functionality, dynamism and precision. To obtain this objective, the finishing operations of the seats containing the table are performed with final mounting, allowing the closest tolerances of shape, not greater than 0.0015 mm and of height less than 0.002 mm, as total value.

Figure 4:
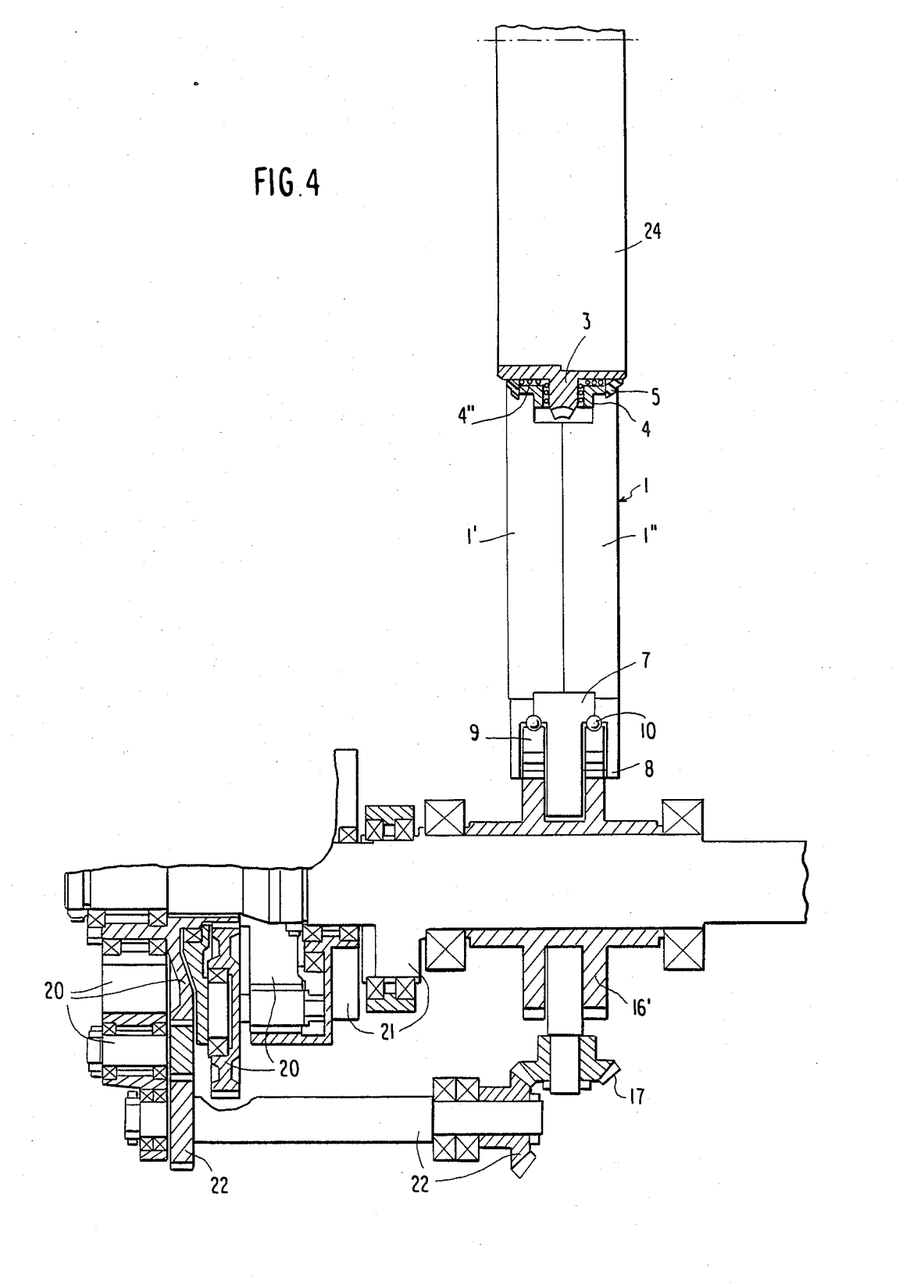
FIG. 4 represents the control mechanism for the hourglass screw causing the rotation of the collet-holding table.
Figure 5A:
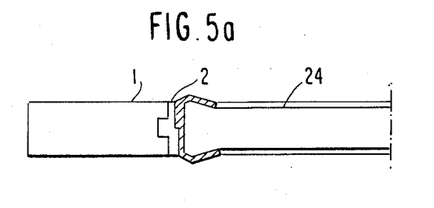
FIG. 5 represents diagrammatically in section a detail of some more significant embodiments of the collet-holding table.
Figure 5B:
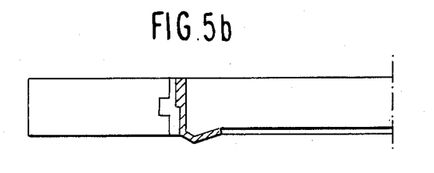
Figure 5C:
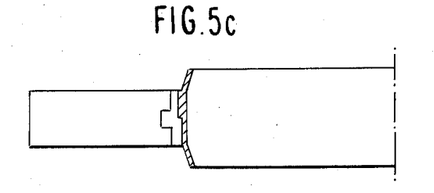
Figure 5D:
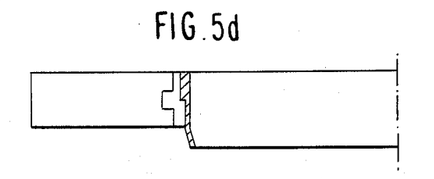
Figure 5E:
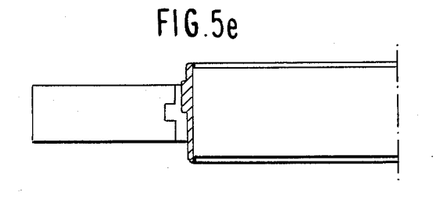
Figure 5F:
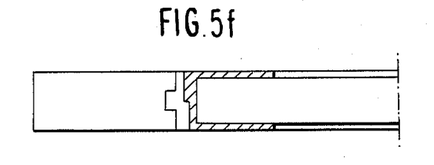
Figure 5G:
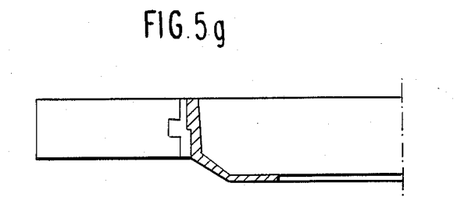
Figure 5H:
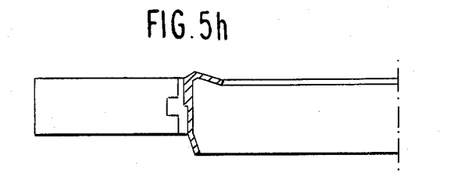
Figure 5I:
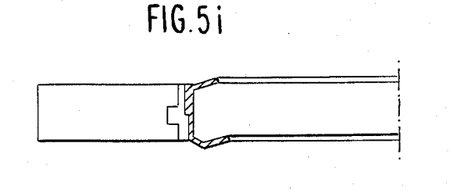
Figure 5J:
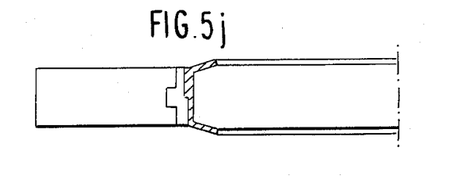
Figure 5K:
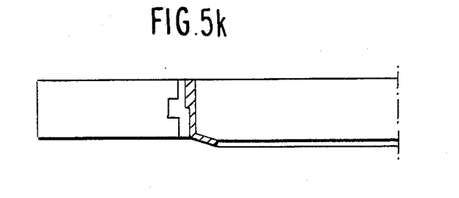
Figure 5M:
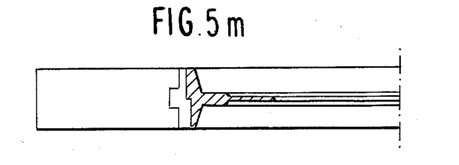
Figure 6:
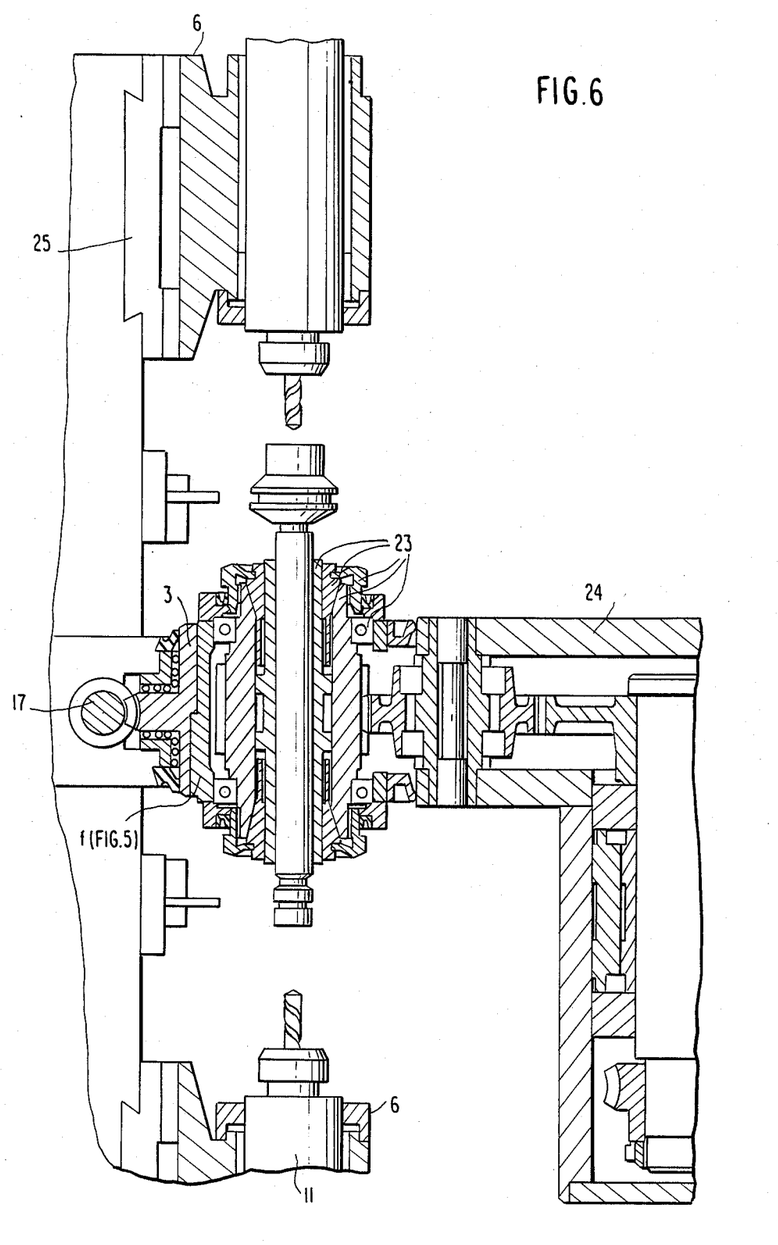
FIG. 6 represents in section a rotating collet with central control.

The mechanism with hourglass screws 17, 18 performing the angular rotation and the positioning of collet-holding table 24, together with the two half-plates 1',1" determine the compactness and stability of the machine,—all the forces that develop during operation being canceled on half-plates 1, 1'. From this flows the possibility of optimizing the workings since operating units 6 fastened to annular base support 1 are compact. Therefore the tools fastened to arbor units 11 reach the workpieces (FIG. 6), held by collets 23, in the best way, with minimum overhang and maximum rigidity with the advantage of the working quality and increased life of the tools. The angular rotation of the table-holding ring 3 therefore is obtained by means of the hourglass screw 17 located between the two annular half-plates 1' and 1" and driven in turn by the control group (FIG. 4), which is fastened to ring 7 and by a variable frequency induction motor double gear 16' for driving gear wheel 9 (FIGS. 1, 3, 4), which run on bearings 10 rolling on races formed by the union of rings 8.

The eccentric shaft, mioved with maltese cross 21 of gear 16' imposes the travel, in a sinusoidal function, which hourglass screw 17 must make with the table-holding ring 3. Hourglass screw 17 receives the movement imposed by the mechanism 21 by means of an overgear 20 and transmission 22 of the same control group which also holds the cams for driving the unit for loading and expulsion of the pieces from the machine. By a suitable double-action cam, the command is imparted to hourglass screw 18, which is fulcrumed at hemispherical pin 19 and functions like a lever and performs the positioning of table-holding ring 3 in perfect synchronization with the rotation of collet-holding table 24 and of the various operating units 6. Control of the operating units is provided by cam-holding groups 16 moved in perfect synchronization with the other functions by gear wheel 9 which control the work progress of the arbor or tool-holder units by simple and direct lever kinematic mechanisms.

Figure 2A:
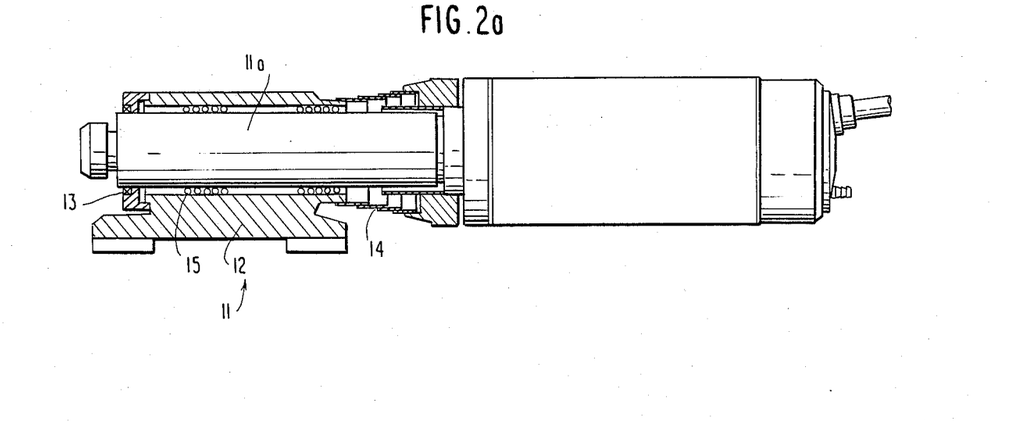
FIG. 2a represents a dynamic axis made up of an electric arbor, in front view, and its guide, in section.

Arbor, electric arbor or tool-holder units 11 as shown in FIG. 2a have their own guide 12 in which, with extreme precision and rigidity, the arbor sleeve 11a travels by means of a ball cage. Guide 12 is also provided with a packing 13, with a telescopic projection 14, which also acts as a return spring, and with a fast dovetail coupling for the connection to the supports of the operating units.

Further details will now be described below which make it possible to give the machine very high precision, extreme versatility and a rapidity never attained until now in the production of very complicated pieces.

Figure 7A:
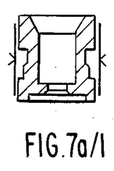
Figure 7B:
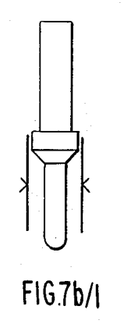
Figure 7C:
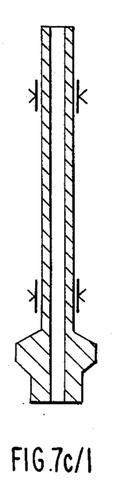

The working cycles indicated in FIGS. 7a–c are examples of the possibilities of the machine, i.e., of its versatility which lends itself well to executing pieces of notable bulk and length with removal requiring high power, and also lends itself well to executing very small pieces or others that are given core heat treatment with a hardness, 60–62 HRc which require grinding workings with abrasive tools and with natural or synthetic diamonds, and at the same time automatic measurements able to discriminate differences of 0.001 mm.

FIG. 7a relates to a mass-production part for the automobile industry. A piece, of highly alloyed steel, about 11 mm in diameter and 12 in length, is first turned on a lathe, then washed and checked, then heat-treated, with core hardening and tempering, to a hardness equal to 60–62 HRc and finally ground, checked and tested, verifying its function.

The cycle, assumed for the execution of the piece on the machine of the invention, with reference to FIGS. 7a/1–a/7 provides:

7a/1: Station (1) opening of the collet, extraction of the finished piece, immediate insertion of a new piece, closing of the collet and checking of the position of the piece in the collet and of the height of the parts to be worked.

7a/2: Station (2) rough grinding of the two head planes with boron nitride grindstones using two high-frequency electric arbors at 80,000 rpm, corresponding to 42 m/sec of peripheral speed. The collet rotates at 2000 rpm.

7a/3: Station (3) finish grinding of the two head planes with boron nitride grindstones using two high-frequency electric arbors at 80,000 rpm, corresponding to 42 m/sec of peripheral speed. The collet rotates at 2000 rpm.

7a/4: Station (4) rough grinding valve seat-small cone with boron nitride grindstone using two high-frequency electric arbors at 180,000 rpm corresponding to 28 m/sec of peripheral speed. The collet rotates at 2000 rpm.

7a/5: Station (5) finish grinding valve seat-small cone with boron nitride grindstone using two high-frequency electric arbors at 180,000 rpm corresponding to 28 m/sec of peripheral speed. The collet rotates at 2000 rpm.

7a/6: Station (6) dimensional checking to be made on both parts. In particular it is necessary to check the length with overall tolerance of 0.03 mm, the oscillation of the two head planes with maximum value of 0.005 mm, and finally the depth, the diameter and roundness of the valve seat with maximum values of 0.02 mm in depth, 0.01 mm for the diameter, and 0.001 for the roundness. The data gathered at this station can also serve for automatic correction of the position of the grindstones at the preceding station. Actually every station equipped for grinding operations has a motor for every direction, in closed loop with the control station for constant resetting of the tolerances.

7a/7: Station (7) functioning tests. The seat just ground is closed by a ball, and a liquid is sent under pressure and the possible pressure loss in thousands of bars is checked. The operations described are now performed in three phases, besides the checking and functional testing which are two other separate phases. The present rate for a known machine is about 20 pieces per minute, while with the machine under discussion about 30 pieces per minute, including measuring, are achieved.

FIG. 7b relates to a mass production part for the electronic and aeronautic industry. The piece, of bronze-beryllium, is turned on a lathe or extruded and then taken again for completion, by performing those operations that are impossible or not very efficient for an automatic lathe or for an extrusion press. The piece does not require working on the part opposite the grinding point in the collet, so that a table is used with collet-holders on radial axes, and considering that it is a piece to be mass produced, a table is chosen with a double series of type "e" collet-holders that can be oriented 360°, thus doubling the amount of pieces produced. The advantage of this solution is obviously economical since the production of two machines is obtained with an investment slightly greater than that necessary for buying one machine.

The cycle, assumed for the execution of the piece on the machine which is the object of the invention, with reference to FIG. 7b/1–7b/7 provides:

7b/1: Station (1) opening of the collet, insertion of the piece, closing of the collet and checking of the position of the piece in the collet.

7b/2: Station (2) drilling, coaxially with the piece, with a hard metal spiral bit and high-frequency electric arbor at 25,000 rpm and drilling of the small crosswise hole with hard metal bit and high-frequency electric arborat 42,000 rpm.

7b/2: during the rotation of the collet-holding table the collet is rotated 180°.

7b/3: Station (3) drilling of the small crosswise hole 180° C. from the preceding one, with a hard metal bit and high-frequency electric arbor at 42,000 rpm.

7b/4: Station (4) drilling, coaxially with the piece, with a hard metal spiral bit and high-frequency electric arbor at 25,000 rpm and deburring of the small crosswise through-hole, with hard metal bit and high-frequency electric arbor at 42,000 rpm. The cams are synchronized so that the incident tools pass twice alternately to eliminate inside burrs.

7b/5: Station (5) grinding of the inclined plane with disk covered with boron nitride and high-frequency electric arbor at 15,000 rpm.

7b/6: Station (6) finish grinding of the inclined plane with a disk covered with boron nitride and high-frequency electric arbor at 15,000 rpm.

7b/7: Station (7) checking of working, opening of collet, extraction of finsihed piece and selection of good pieces, rejection of pieces according to checking of working and checking of tools of preceding stations. The rate of producing the piece is about 120 pieces per minute, therefore the production will be about 240 pieces per minute.

FIG. 7c relates to a mass production part for the automobile industry. The piece is of highly alloyed hardened and tempered steel resistant to high temperatures, about 20 mm in diameter and 115 mm in length. The cycle is assumed for the execution of the piece on the machine in accordance with an object of the invention, with reference to FIG. 6 and FIG. 7c/1–c/7 and provides:

7c/1: Station (1) opening of the collet, extraction of the finished piece, loading of a new piece, closing of the collet and checking of the loading position of the piece.

7c/2: Station (2) coaxial drilling of the piece on both sides with hard metal tool with CBN tip and electric high-frequency arbors at 4,000 rpm. Rotation of collet is 3,200 rpm.

7c/3: Station (3) coaxial drilling of the piece on both sides with hard metal tools with CBN tip and electric high-frequency arbors at 5,600 rpm and turning of the first two outside channels on the ends of the piece with tools with CBN tip. Rotation of collet is 3,200 rpm.

7c/4: Station (4) coaxial boring of the piece on both sides with hard metal tools with CBN tip and electric high-frequency arbors at 5,600 rpm and finish turning of the larger outside channel and turning of a third channel at opposite end with tools with CBN tip. Rotation of collet is 3,200 rpm.

7c/5: Station (5) coaxial drilling of the piece on one side and calibrating of the opposite part with hard metal tools with CBN tip and high-frequency electric arbors at 5,600 rpm for the first and 4,000 rpm for the second and facing turning on the heads of the two ends of the piece with tools with CBN tip.

Rotation of the collet is 3,200 rpm.

7c/6: Station (6) finishing with the inside on one part and finishing seat bottom with radius on the opposite part with hard metal tools with CBN tip and high-frequency electric arbors at 6,000 rpm and finishing of the facing on the heads at the two ends of the piece with tools with CBN tip. Rotation of the collet is 3,200 rpm.

7c/7: Station (7) dimensional checking of all the working performed.

The rate of this piece is about 10 pieces per mnute. At present, with the known machines the same cycle is performed on three different machines such as a multiple-arbor lathe and the dimensional checkings are performed on each piece manually with the help of templates and comparators. In summary, the object of the invention is an automatic transfer machine with a rotating table, integrated with electronic control, able to make, automatically and repetitively, mechanical parts which, for their functioning, require:

workings performed simultaneously and on various dynamic axes, both on the right and left, with respect to the point of holding of the piece (including possible insertion of other parts).

The machine is actually equipped with a device for the rotation of the collet-holding table and its positioning, normally in seven positions, with great precision and rigidity inside of which is inserted the collet-holding table and around which is an annular base support which makes it possible to fasten, on two flat, opposite surfaces, seven plus seven identical operating units, each of which achieves from one to four dynamic axes in addition to the axis of the individual collets which can also be dynamic.

The working movement and rotation of the tool or piece can be given at the same time to the tool and to the piece with free choice of the values of speed and direction of rotation. The individual movements are actually performed by different powerful induction motors (extremely compact) operated at variable frequency (to up and beyond 3000 Hz).

The movements that perform the advance of the tool are normally controlled by cams that reach the point of use by simple, sturdy lever kinematic mechanisms.

The control of the levers, synchronized with the rotation-positioning of the table, can be achieved in several ways:

Integrated (mechanical synchronization): a single variable-frequency induction motor is provided for performing the rotation-positioning of the table and transmission to gear wheels which moves the individual cam-holding groups (every station has a double group that comes up to four cams per part).

Concordant (electronic synchronization): a variable-frequency induction motor is provided for performing the translation-index and a second variable-frequency induction motor is provided for performing the transmission to the gear wheels which moves the cam-holding groups.

Pluriconcordant (electronic synchronization): a variable-frequency induction motor is provided for performing the translation-index and a second variable-frequency induction motor is provided for performing the transmission to the gear wheels which moves the cam-holding groups. One or more autonomous operating units have their own motor, always induction, which directly controls the specific cam or cams.

Hybrid (electronic synchronization): this type of control differs from the preceding ones inasmuch as there are one or more operating units which perform the relative advance movements and have their own digitally controlled induction motor.

Semi-independent (electronic synchronization): for the three possibilities already mentioned: concordant, pluriconcordant and hybrid there is also the variant of separately controlling the operating units mounted on one surface of the annular plate and those mounted on the opposite surface. This solution is provided since it is possible to mount a table with totally independent collets and therefore obviously suitable for having the relative control.

The extremely compact innovative design, the vast possiblities of control, the effective protection of the mechanisms and the electrical parts from chemical and mechanical aggression (it is possible to work dry, with water, with cutting oil and in the presence of abrasives), are determining factors that allow the application of advanced working technologies:

chipping with tools (optionally coated) of hard metal, ceramics or natural or artificial diamonds, for the following operations: drilling, boring, plunge and cut internal-external turning, milling, milling-turning, internal-external boring and internal-external threading with pattern, plunge and cut grinding (with oscillating movement) with diamond or CBN grindstones, lapping with diamond or CBN, removal with laser or water jet, plastic deformation by pressure or by rolling, welding by friction or with laser (even different materials), measurement of heights and relative selection.

The achievement of the machine is possible by the very particular mechanism of the rotation-positioning group of the table, which, thanks to the linearity of design and the small number of independent parts that contribute to the entire device, makes possible, besides the extreme compactness, a very high degree of precision, repeatability, mechanical rigidity and very high dynamism. Therefore, the machine lends itself well to producing those parts which, besides what has already been said, have the following requirements:

strict working tolerances low roughness of the worked surfaces high rationalization (because of the need to obtain a low production cost)

high production rates great flexiblity (to make it possible to produce rationally a great number of parts and therefore the total recovery of the investment even in the case of modest specific productions).

In the development of the design much care has been given to the use and maintenance factors. The machine, thanks to its annular, therefore closed, and perfectly symmetrical structure can be mounted in any position: horizontal, vertical or inclined.

Considering that workings are performed on both sides and on axes, that the rate can reach very high values up to 150 cycles per minute (therefore many chips even for small pieces) and that it is possible to substitute the collet-holding table without dismounting the operating units, normally the vertical position is selected which is the best compromise. In this position, every group, operating unit or cam-holder, has maximum accessibility either for normal maintenance operations or tool change or for possible substitution of the group. Also the visibility and discharge of the chips are optimal: all the tools, during work, can be followed visually (for example, with a stroboscope) and most of the chips fall freely into the recovery tank.

The operating units, depending on the function they are to perform, exhibit a specific configuration, but different components are the same ones mounted in a different way, so that modernization of a specific unit to use it for a new function is possible. In substance, the design of the machine enables the user to adapt dynamically to the changing demands of the market.

The electric arbors and tool-holders are finished units, which are rapidly mounted and dismounted from the operating units. A special coupling system provides for guaranteeing the necessary precision of positioning even in the case of frequent maneuverings. The system is the essential premise for being able to adjust the tools outside the machine; which makes it possible to reduce to a minimum the idle times due to machine stoppage since the preparation of already prearranged second units is possible.

The advance movement (dynamic axis) of the tool is made by the arbor itself (or the tool-holding unit) making the sleeve of the arbor slide directly in a bushing and by a ball cage.

This type of guiding, certainly optimal and rational, in any case is the only one that can guarantee the very high degree of precision and rigidity required for the functioning of this new machine. To avoid annoying troubles or premature wear because of dirt and chips which could get into the ball cage, the guide system is mounted, complete with suitable protection, directly on the sleeves of the electric arbors or tool-holder units. Every guide system has a fast coupling-uncoupling device for connection, simply and absolutely repetitively, to the operating unit fastened to the annular support.

Said guide systems are also equipped with pins for fast coupling-uncoupling, with the advance lever transmission, and axial adjustment, which can be done either in the machine or outside the machine, which allows the correction of the work depth, or in any case the distance of the tool from the striking point.

Adjustment of the tools, as already said, can be done outside the machine. For this purpose, a code digital device is provided, able to recognize automatically on which arbor (or tool-holder unit) working is being done, which allows the direct comparison between the actual height of a specific tool and the height, in memory, which it should have. For determining the heights that are to be set up, normally two linear electronic comparators are provided which act on perpendicular axes.

I claim:

1. An automatic transfer machine for performing simultaneous working operations on different portions of workpieces of variable size and with respect to a plurality of axes to increase the productivity and precision of the working process, comprising
    (a) a working machine integrated with a computer program for automatically performing a plurality of simultaneous working operations on different axes;
    (b) a collet-holding table including collets which hold the workpieces, said collets being located coaxially by intermediate elements between two annular half-plates fastened together to form the base support of said working machine and externally holding the working tools thereof;
    (c) said two half-plates having an internal mirror-like configuration for containing guide elements and control elements for rotation and positioning of said collet-holding table, said intermediate elements comprising a ring affording substitution of different collet-holding tables;
    (d) said collet-holding table including intermittence control elements rotating in two directions, said table being capable of continuous rotation by a dedicated motor; and
    (e) means for advancing the working tools of said working machine, said advancing means including cams which reach the working position by kinematic mechanisms and levers operated in synchronism with the control elements of the collet-holding table.

2. Apparatus as defined in claim 1, wherein said guide elements comprise two ball bearings protected outwardly by two packings and including races having a square cross-sectional configuration, said races being inserted in respective ones of said annular half-plates of the base support to guide said ring with dynamic and static precision and rigidity.

3. Apparatus as defined in claim 1, wherein said rotation control elements comprise two hourglass screws, one of said screws controlling angular rotation and the other of said screws controlling the position of said collet-holding table, said other hourlgass screw engaging helicoidal toothing arranged on the outside of said table and being arranged in seats provided in said annular half-plates.

4. Apparatus as defined in claim 1, wherein the rotational movement of said collet-holding table is obtained by hourglass screws which are operated intermittently by a mechanism imparting acceleration proportional to the time preselected for completing the angle of transfer according to a sinusoidal function.

5. Apparatus as defined in claim 1, wherein indexing positioning of said collet-holding table is obtained, with extreme precision and rigidity, by an hourglass screw fulcrumed at one end and functioning like a lever operated by a kinematic mechanism and synchronized to the angular rotational movement of said collet-holding table to impart a sinusoidal movement that causes said hourglass screw to engage, with a fixed pressure on primitive generatrices, helicoidal toothing arranged on the outside of said table, and a small angular movement around the longitudinal axis of said hourglass screw to permit a micrometric angular and unidirectional correction of the table to improve the positioning precision.

6. Apparatus as defined in claim 1, wherein the work movement, at each stopping point and independently of the other stopping points, is assigned to the workpiece and to the working tool to obtain on the workpiece minimum tolerances of concentricity on the order of microns.

7. Apparatus as defined in claim 1, wherein the rotary movement of each collet is imparted by a corresponding high frequency induction electric motor providing individual adjustment of the actual value of the working frequency at each stopping point to adapt the speed to the requirements of the work cycle of a specific workpiece being produced.

8. Apparatus as defined in claim 1, wherein the rotary movement to various collets is imparted by a high-frequency central induction electric motor affording adjustment of the actual value of the working frequency to adapt this speed to the requirements of the workpiece being produced.

9. Apparatus as defined in claim 1, wherein synchronization between the control of said cams for the working tools and the control for the rotation-positioning of said table integrated with mechanical synchronization is provided by a single variable frequency induction motor for operating one of the group of control elements for rotation-positioning of said table and the transmission to gear wheels which move individual cam-holding groups of which, for each station, a double group comprising up to four cams per part is available.

10. Apparatus as defined in claim 1, wherein the synchronization between the control of said cams for the working tools, and the group of elements for the control of the rotation-positioning of said table concordant with electronic synchronization is provided by a first variable frequency induction motor for operating the group of control elements for rotation-positioning of said table and a second variable frequency induction motor for performing the transmission to gear wheels which move cam-holding groups.

11. Apparatus as defined in claim 1, wherein the synchronization between the control of said cams for the working tools, and the group of elements for the control of the rotation-positioning of the table pluriconcordant with electronic synchronization is provided by a first variable frequency induction motor for operating the group of control elements for rotation-positioning of the table, a second variable frequency induction motor for performing the transmission to gear wheels which move said cam-holding groups, and at least one autonomous working tool having an associated induction motor directly operating at least one specific cam of the tool.

12. Apparatus as defined in claim 1, wherein electronic synchronization between the control of said cams for the operating units and the group of elements for control of the rotation-positioning of the table is provided by a first variable frequency induction motor for operating the group of elements for rotation-positioning of the table, a second variable frequency induction motor for performing the transmission to gear wheels which move said cam-holding groups, and at least one autonomous working tool having an associated induction motor directly operating at least one specific cam of the tool and simultaneously at least one working tool performs the relative advance movements, each tool having its own digitally controlled induction motor.

13. Apparatus as defined in claim 1, wherein semi-independent electronic synchronization between the control of said cams for the working tools and the group of elements for control of the rotation-positioning of the table is provided by separate control of said working tools mounted on one surface of said annular base support and those mounted on the opposite surface.

14. Apparatus as defined in claim 1, wherein advance movement along the dynamic axis of the tool is achieved by the arbor and by the tool-holding unit by direct sliding of the sleeve of the arbor in a guide by a ball cage protected by a packing and on the other part by a telescopic spring with fast dovetail coupling for fast connection to any of said working tools.

* * * * *